US012746911B2

(12) United States Patent
Song et al.

(10) Patent No.: US 12,746,911 B2
(45) Date of Patent: Sep. 29, 2026

(54) VEHICLE CONTROL METHOD AND VEHICLE CONTROL DEVICE

(71) Applicants: HYUNDAI MOTOR COMPANY, Seoul (KR); KIA CORPORATION, Seoul (KR)

(72) Inventors: Seok Beom Song, Seoul (KR); Tae Yong Song, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 146 days.

(21) Appl. No.: 18/749,861

(22) Filed: Jun. 21, 2024

(65) Prior Publication Data

US 2025/0269840 A1 Aug. 28, 2025

(30) Foreign Application Priority Data

Feb. 23, 2024 (KR) ........................ 10-2024-0026685

(51) Int. Cl.

| | |
|---|---|
| ***B60W 30/00*** | (2006.01) |
| ***B60W 30/06*** | (2006.01) |
| ***G06T 7/00*** | (2017.01) |
| ***G06T 7/70*** | (2017.01) |
| ***G06V 20/00*** | (2022.01) |
| ***G06V 20/58*** | (2022.01) |

(52) U.S. Cl.

CPC ............... *B60W 30/06* (2013.01); *G06T 7/70* (2017.01); *G06V 20/586* (2022.01); *G06T 2207/30264* (2013.01)

(58) Field of Classification Search

CPC ..................... B60W 30/06; G06T 7/70; G06T 2207/30264; G06V 20/586

USPC ............................................................ 701/23

See application file for complete search history.

(56) References Cited

U.S. PATENT DOCUMENTS

| | | | | |
|---|---|---|---|---|
| 2018/0086381 | A1* | 3/2018 | Hoffman, Jr. ........ | G05D 1/0225 |
| 2021/0271903 | A1* | 9/2021 | Kaneko ................ | G06V 20/586 |
| 2024/0227785 | A1* | 7/2024 | Wang ................... | G06V 20/586 |

* cited by examiner

*Primary Examiner* — Tiffany P Young
(74) *Attorney, Agent, or Firm* — Lempia Summerfield Katz LLC

(57) ABSTRACT

A vehicle control method includes: measuring, by a measuring device, coordinates of a first entrance point that is an end point of a first entrance line in a first parking slot; generating, by a generating device, a first entrance line measurement length based on the measured coordinates of the first entrance point; generating, by the generating device, a first entrance line tracking length by tracking a length of the first entrance line based on the first entrance line measurement length; and calibrating, by a calibrating device, the coordinates of the first entrance point based on a first error that is a difference between the first entrance line tracking length and the first entrance line measurement length.

16 Claims, 13 Drawing Sheets

VEHICLE CONTROL METHOD AND VEHICLE CONTROL DEVICE

CROSS-REFERENCE TO RELATED APPLICATION

This application claims the benefit of and priority to Korean Patent Application No. 10-2024-0026685, filed in the Korean Intellectual Property Office on Feb. 23, 2024, the entire contents of which are incorporated herein by reference.

TECHNICAL FIELD

The technical idea of the present disclosure relates to a vehicle control method and device.

BACKGROUND

In recent advancements in autonomous driving technology, various artificial intelligence models, such as object detection, semantic segmentation, depth map estimation, and lane detection, have been studied, leveraging deep neural network-based computer vision technology. In particular, research is ongoing to determine the position of a parking slot using artificial intelligence models and to perform autonomous parking. For example, autonomous parking may be performed by measuring the coordinates of the entrance point of a parking slot using a network that recognizes the parking slot. For autonomous parking, it may be necessary to obtain the exact coordinates of the entrance point of a parking slot.

SUMMARY

The present disclosure has been made to solve the above-mentioned problems occurring in the prior art while advantages achieved by the prior art are maintained intact.

An aspect of the present disclosure provides a method and a device for obtaining the exact coordinates of the entrance point of a parking slot.

An aspect of the present disclosure provides a method and a device for calibrating the coordinates of the entrance point of a parking slot if there is a slope on the road surface on which a vehicle is located.

An aspect of the present disclosure provides a method and a device for reducing errors in a route for autonomous parking control.

An aspect of the present disclosure provides a method and a device for shortening time required to determine a route for autonomous parking control.

An aspect of the present disclosure provides a method and a device for improving the performance of autonomous parking.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a vehicle control method includes: measuring, by a measuring device, coordinates of a first entrance point that is an end point of a first entrance line in a first parking slot; and generating, by a generating device, a first entrance line measurement length based on the measured coordinates of the first entrance point. The vehicle control method further includes: generating, by the generating device, a first entrance line tracking length by tracking a length of the first entrance line based on the first entrance line measurement length; and calibrating, by a calibrating device, the coordinates of the first entrance point based on a first error that is a difference between the first entrance line tracking length and the first entrance line measurement length.

According to an embodiment, the generating of the first entrance line tracking length may include generating, by the generating device, the first entrance line tracking length by updating a second entrance line tracking length generated in a previous frame if i) a difference between a center point of the first entrance line and a longitudinal position of a side camera of a vehicle is less than a first threshold, and ii) a difference between the first entrance line measurement length and an entrance line reference length is less than a second threshold.

According to an embodiment, the generating of the first entrance line tracking length may include generating, by the generating device, the first entrance line tracking length by updating the second entrance line tracking length based on i) the second entrance line tracking length generated in the previous frame and ii) the first entrance line measurement length generated in a current frame.

According to an embodiment, the generating of the first entrance line tracking length may include generating, by the generating device, the first entrance line tracking length by predicting the first entrance line tracking length based on the second entrance line tracking length and the first entrance line measurement length using an arbitrary filter.

According to an embodiment, the second entrance line tracking length may be the entrance line reference length if tracking for the length of the first entrance line is first performed in the previous frame.

According to an embodiment, the calibrating of the coordinates of the first entrance point may include calibrating, by the calibrating device, the coordinates of the first entrance point based on the first error and an angle between a vehicle and a parking line adjacent to the first entrance line in the first parking slot if the first error is greater than a third threshold.

According to an embodiment, the vehicle control method may further include: measuring, by the measuring device, coordinates of a second entrance point of a second parking slot; and generating, by the generating device, a second entrance line measurement length based on the coordinates of the second entrance point. The vehicle control method may further include: generating, by the generating device, a second error that is a difference between the first entrance line tracking length and the second entrance line measurement length; measuring, by the measuring device, coordinates of a third entrance point of a third parking slot; and generating, by the generating device, a third entrance line measurement length based on the coordinates of the third entrance point. The vehicle control method may further include: generating, by the generating device, a third error that is a difference between the first entrance line tracking length and the third entrance line measurement length; and first calibrating, by the calibrating device, coordinates of an entrance point of a parking slot corresponding to a smaller value between the second error and the third error among the second parking slot and the third parking slot.

According to an embodiment, the measuring of the coordinates of the first entrance point of the first parking slot may include measuring, by the measuring device, the coordinates of the first entrance point of the first parking slot based on a Bird's Eye View (BEV) image through a neural network.

According to an aspect of the present disclosure, a vehicle control device includes a memory that stores computer-executable instructions and at least one processor that accesses the memory and executes the instructions. The at least one processor may measure, through a measuring device, coordinates of a first entrance point that is an end point of a first entrance line in a first parking slot. The at least one processor may generate, through a generating device, a first entrance line measurement length based on the measured coordinates of the first entrance point and generate a first entrance line tracking length by tracking a length of the first entrance line based on the first entrance line measurement length. The at least one processor may calibrate, through a calibrating device, the coordinates of the first entrance point based on a first error that is a difference between the first entrance line tracking length and the first entrance line measurement length.

According to an embodiment, the at least one processor may generate, through the generating device, the first entrance line tracking length by updating a second entrance line tracking length generated in a previous frame if i) a difference between a center point of the first entrance line and a longitudinal position of a side camera of a vehicle is less than a first threshold, and ii) a difference between the first entrance line measurement length and an entrance line reference length is less than a second threshold.

According to an embodiment, the at least one processor may generate, through the generating device, the first entrance line tracking length by updating the second entrance line tracking length based on the second entrance line tracking length generated in the previous frame and the first entrance line measurement length generated in a current frame.

According to an embodiment, the at least one processor may generate, through the generating device, the first entrance line tracking length by predicting the first entrance line tracking length based on the second entrance line tracking length and the first entrance line measurement length using an arbitrary filter.

According to an embodiment, the second entrance line tracking length may be the entrance line reference length if tracking for the length of the first entrance line is first performed in the previous frame.

According to an embodiment, the at least one processor may calibrate, through the calibrating device, the coordinates of the first entrance point based on the first error and an angle between a vehicle and a parking line adjacent to the first entrance line in the first parking slot if the first error is greater than a third threshold.

According to an embodiment, the at least one processor may measure, through the measuring device, coordinates of a second entrance point of a second parking slot and coordinates of a third entrance point of a third parking slot. The at least one processor may generate, through the generating device, a second entrance line measurement length based on the coordinates of the second entrance point, generate a second error that is a difference between the first entrance line tracking length and the second entrance line measurement length, and generate a third entrance line measurement length based on the coordinates of the third entrance point. The at least one processor may generate a third error that is a difference between the first entrance line tracking length and the third entrance line measurement length. The at least one processor may first calibrate, through the calibrating device, coordinates of an entrance point of a parking slot corresponding to a smaller value between the second error and the third error among the second parking slot and the third parking slot.

According to an embodiment, the at least one processor may measure, through the measuring device, the coordinates of the first entrance point of the first parking slot based on a Bird's Eye View (BEV) image by using a neural network.

The features briefly summarized above for the present disclosure are only illustrative aspects of the detailed description of the present disclosure that follows, but do not limit the scope of the present disclosure.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
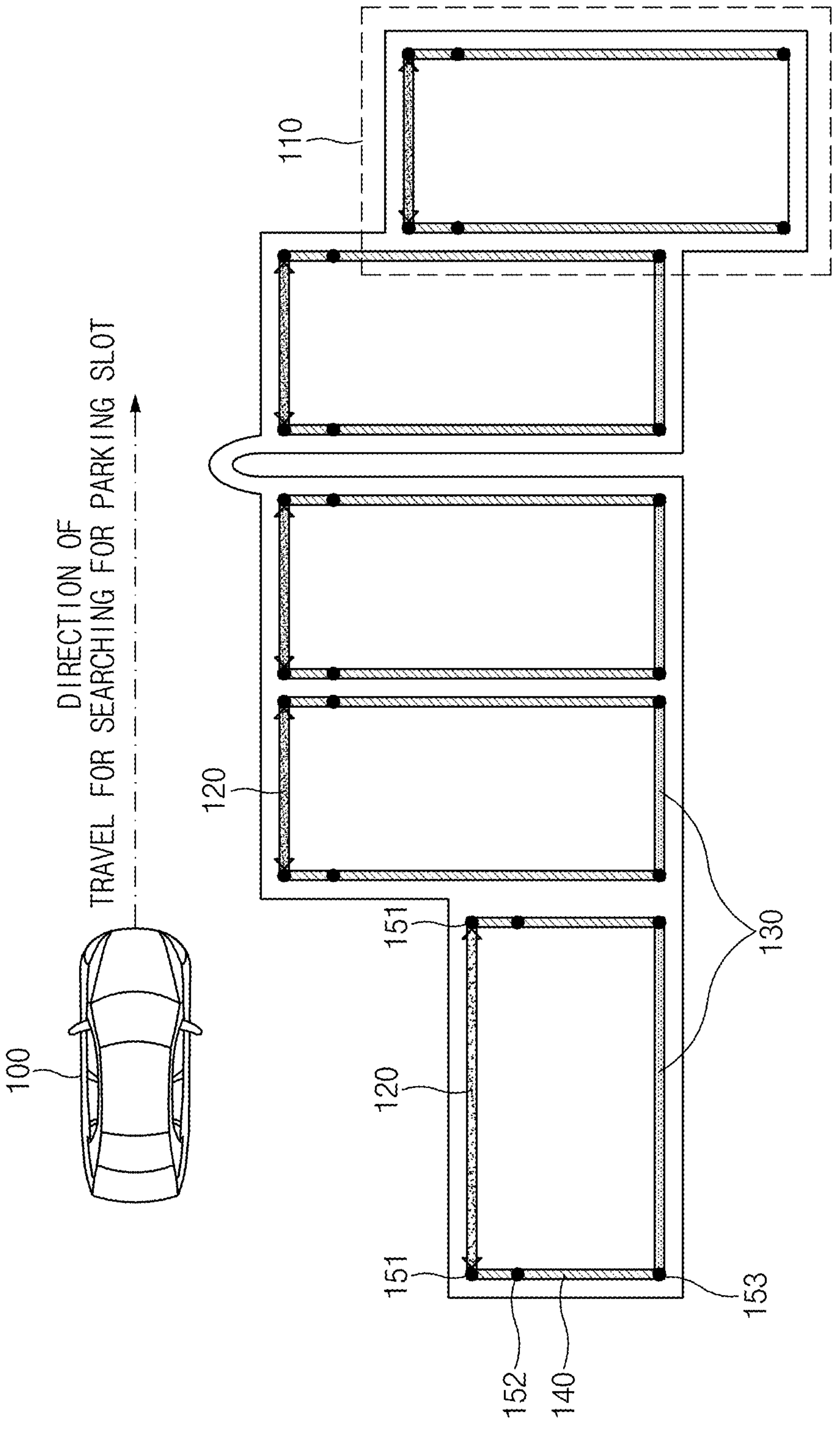
FIG. 1 is a diagram for describing a parking slot position calibration method according to an embodiment of the present disclosure.

Hereinafter, with reference to the accompanying drawings, embodiments of the present disclosure are described in detail such that those of ordinary skill in the art may easily carry out the present disclosure. However, the present disclosure may be embodied in many different forms and should not be construed as limited to the embodiments set forth herein.

Further, in describing the embodiment of the present disclosure, a detailed description of well-known features or functions is ruled out in order not to unnecessarily obscure the gist of the present disclosure. In the drawings, parts not related to the description are omitted, and like reference numerals refer to like elements throughout the specification.

In the present disclosure, it should be understood that when an element is referred to as being "connected to", "coupled to", or "combined with" another element, the element may be directly connected or coupled to or combined with the another element or intervening elements may be present therebetween. It should be further understood that the terms "comprise", "include" or "have" when used in the present disclosure specify the presence of stated elements but do not preclude the presence or addition of one or more other elements.

In the present disclosure, terms such as first and second are used only for the purpose of distinguishing one element from other elements, and do not limit the order or importance of the elements unless specifically mentioned. Accordingly, within the scope of the present disclosure, a first component in one embodiment may be referred to as a second component in another embodiment, and similarly, the second component in one embodiment may be referred to as a first component in another embodiment.

In the present disclosure, distinct elements are only for clearly describing their features, and do not mean that the elements are separated necessarily. In other words, a plurality of elements may be integrated to form a single hardware or software unit, or a single element may be distributed to form a plurality of hardware or software units. Accordingly, such integrated or distributed embodiments are included in the scope of the present disclosure, even if not otherwise noted.

In the present disclosure, elements described in the various embodiments are not necessarily essential elements, and some elements may be optional. Accordingly, embodiments including a subset of the elements described in one embodiment are also included in the scope of the present disclosure. Additionally, embodiments that include other components in addition to those described in the various embodiments are also included in the scope of the present disclosure.

In the present disclosure, expressions of positional relationships used in the specification, such as top, bottom, left, or right, are described for convenience of description, and when the drawings shown in the specification are viewed in reverse, the positional relationships described in the specification may also be interpreted in the opposite way.

In the present disclosure, each of the phrases "A or B," "at least one of A and B," "at least one of A or B," "A, B or C," "at least one of A, B and C," and "at least one of A, B, or C" may include any one of items listed along with a relevant phrase, or any possible combination thereof.

When a component, device, element, or the like of the present disclosure is described as having a purpose or performing an operation, function, or the like, the component, device, or element should be considered herein as being "configured to" meet that purpose or to perform that operation or function.

The term "unit" "device" or "module" used in this specification signifies one unit that processes at least one function or operation, and may be realized by hardware, software, or a combination thereof. The operations of the method or the functions described in connection with the forms disclosed herein may be embodied directly in a hardware or a software module executed by a processor, or in a combination thereof.

Hereinafter, embodiments of the present disclosure are described in detail with reference to FIGS. 1-8.

FIG. 1 is a diagram for describing a method of correcting a parking slot position according to an embodiment of the present disclosure.

Referring to FIG. 1, a vehicle 100 may search for the location of a parking slot 110. For example, the vehicle 100 may search for the location of the parking slot 110 on the side using a side camera mounted on the vehicle 100. The parking slot 110 may refer to a space in which a vehicle is parked.

Each of parking slots may include an entrance line 120, an end line 130, parking lines 140, entrance points 151, midpoints 152, and end points 153. The entrance line 120 may refer to a line through which a vehicle enters a parking slot. Both end points of the entrance line 120 may be referred to as the entrance points 151. The end line 130 may represent the opposite side of the entrance line 120, but is not limited thereto. Both end points of the end line 130 may be referred to as the end points 153. The two sides adjacent to the entrance line 120 in the parking slot 110 may be referred to as the parking lines 140. Any point on the parking line 140 may be referred to as the midpoint 152. Although not shown in the drawings, an angle related to the angle between the parking line 140 and the vehicle may be referred to as an entrance line angle. If the parking slot 110 is located on the right side of the vehicle 100, the entrance line angle may have a negative value. Additionally, if the parking slot 110 is located on the left side of the vehicle 100, the entrance line angle may have a positive value. For example, as shown in FIG. 1, if there is the parking slot 110 on the right side of the vehicle 100 and the angle between the parking line 140 and the vehicle 100 is 90°, the entrance line angle may be −90°.

The location of the entrance point 151 of the parking slot 110 may be calculated based on camera calibration information. Camera calibration may be calculated assuming that the road surface on which the vehicle 100 exists has no slope. Therefore, if there is a slope on the road surface where the vehicle is located, an error may occur in measuring the location of the entrance point of the parking slot. If an error occurs in the location of the entrance point, an error may also occur in creating a route for autonomous parking, and it may take a lot of time to determine the route for autonomous parking, which may deteriorate the performance of autonomous parking. A parking slot position calibration method according to an embodiment of the present disclosure may obtain the exact location of the entrance point even if there is a slope on the road surface where the vehicle 100 is located. The parking slot position calibration method may correspond to the vehicle control method.

Figure 2:
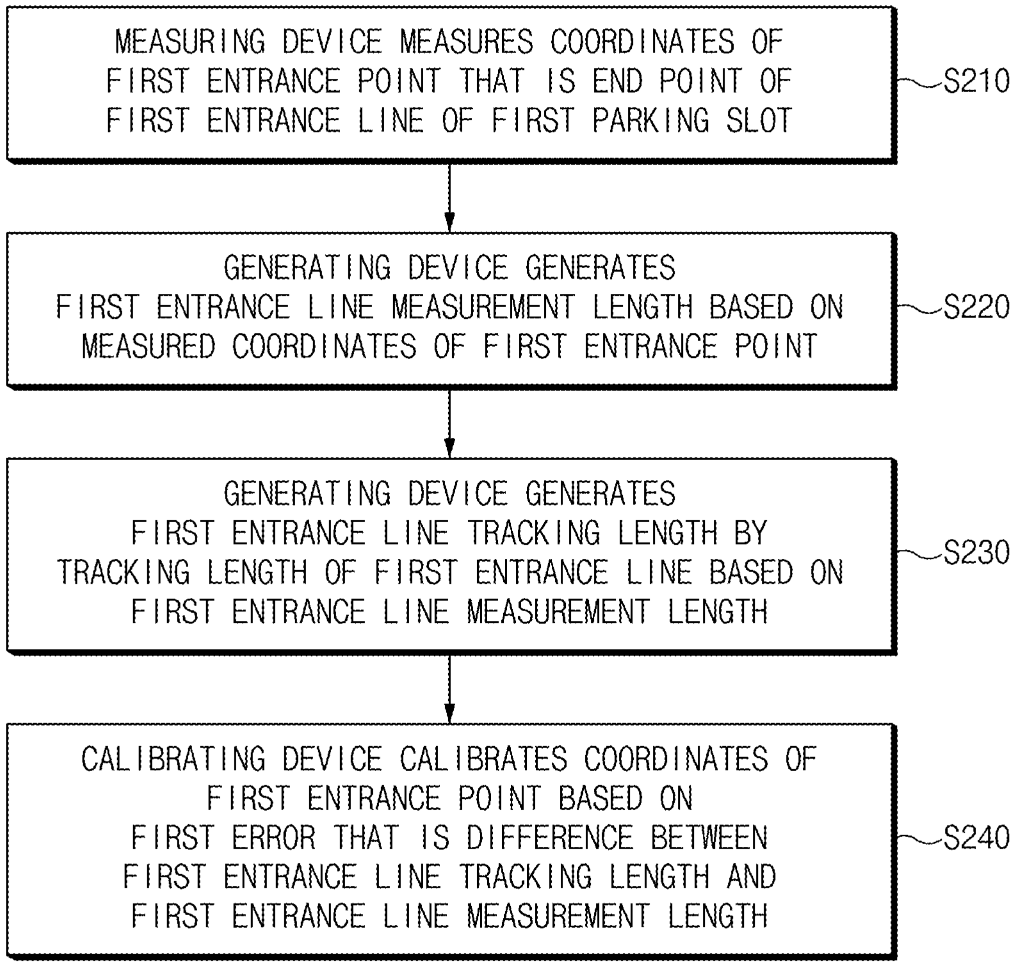
FIG. 2 is a flowchart illustrating a parking slot position calibration method according to an embodiment of the present disclosure.

FIG. 2 is a flowchart illustrating a parking slot position calibration method according to an embodiment of the present disclosure.

Figure 3:
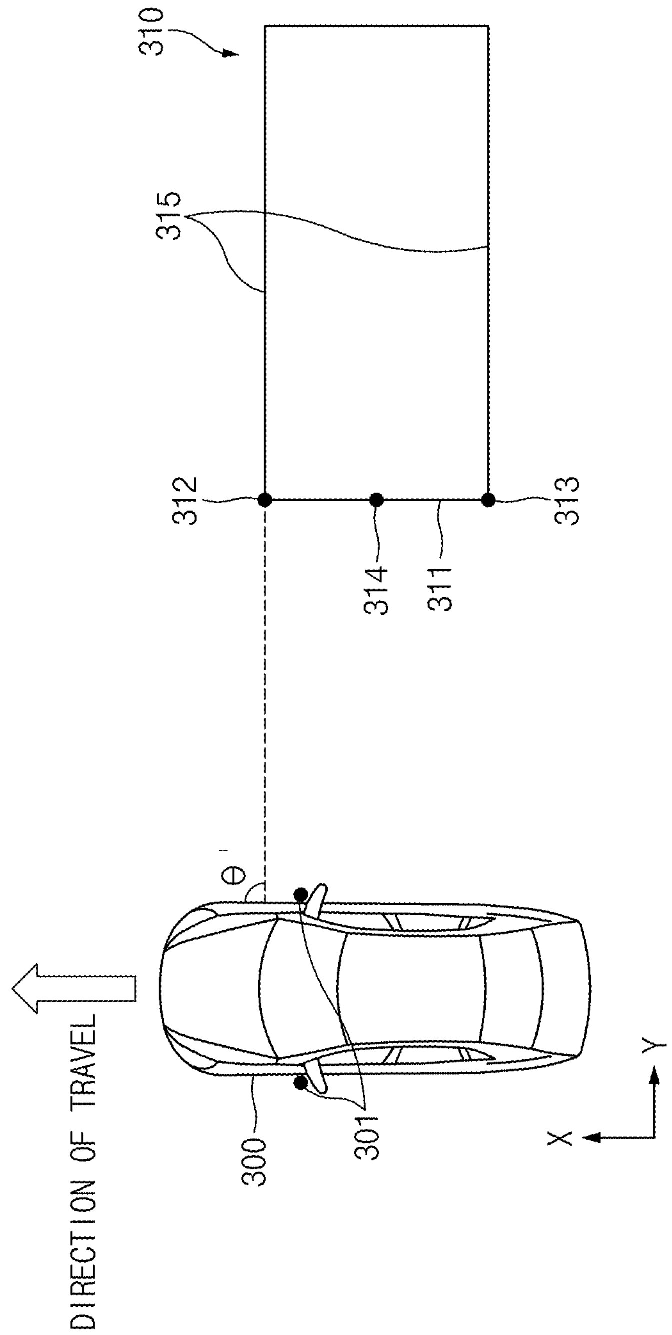
FIG. 3 is a diagram for describing a parking slot position calibration method according to an embodiment of the present disclosure.

FIG. 3 is a diagram for describing a parking slot position calibration method according to an embodiment of the present disclosure. A description for FIG. 2 is given with reference to FIG. 3 below.

Referring to FIGS. 2 and 3, a parking slot position calibration method according to an embodiment of the present disclosure may include measuring, by a measuring device, coordinates of first entrance points 312 and 313 of a first parking slot 310 in an operation S210. For example, the parking slot position calibration method may include measuring the coordinates of the first entrance points 312 and 313 of the first parking slot 310 based on a BEV (Bird's Eye View) image through a neural network, but is not limited thereto. The neural network may be PSRNet, but is not limited thereto.

The parking slot position calibration method may include generating, by a generator, a first entrance line measurement length based on the measured coordinates of the first entrance points 312 and 313 in an operation S220. For example, the parking slot position calibration method may include generating the first entrance line measurement length by calculating the distance between the first entrance points 312 and 313, which are both end points of a first entrance line 311. Specifically, the parking slot position calibration method may include generating the first entrance line measurement length by calculating the Euclidean distance between the first entrance points 312 and 313.

In an operation S230, the parking slot position calibration method may include generating, by the generator, a first entrance line tracking length by tracking the length of the first entrance line 311 based on the first entrance line measurement length. More specific details about tracking the length of the first entrance line 311 are described below.

The parking slot position calibration method may include calibrating, by a calibrating device, the coordinates of the first entrance points 312 and 313 based on a first error, which is the difference between the first entrance line tracking length and the first entrance line measurement length, in an operation S240. In other words, the equation of "first error=|first entrance line tracking length-first entrance line measurement length|" may be established, and the parking slot position calibration method may include calibrating the coordinates of the first entrance points 312 and 313 based on the first error. For example, the coordinates of the first entrance points 312 and 313 may be calibrated based on the first error and an entrance line angle θ related to the angle between a vehicle 300 and a parking line 315 adjacent to the first entrance line 311 in the first parking slot 310. The entrance line angle θ may have negative and positive values, respectively, depending on whether the parking slot is on the right or left side of the vehicle. For example, e', which is the angle between the vehicle 300 and the parking line 315, may be 90°, and because the first parking slot 310 is on the right side of the vehicle 300, the entrance line angle θ having a negative value may be −90°, i.e., the −θ' value. More specific details about calibrating the coordinates of the first entrance points 312 and 313 are described below.

Figure 4:
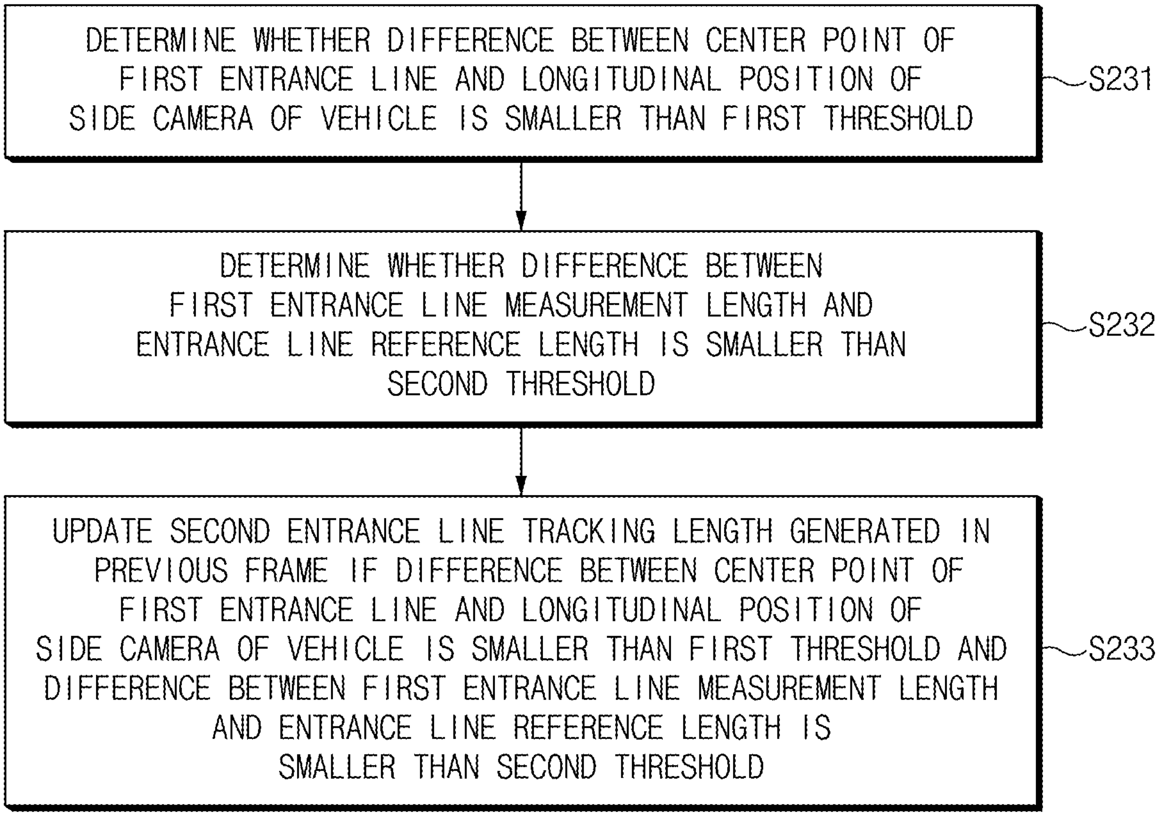
FIG. 4 is a flowchart illustrating a parking slot position calibration method according to an embodiment of the present disclosure.

FIG. 4 is a flowchart illustrating a parking slot position calibration method according to an embodiment of the present disclosure. The flowchart of FIG. 4 may be a flowchart describing the operation S230 of FIG. 2 in more detail. A description for FIG. 4 is given with reference to FIG. 3.

Referring to FIGS. 3 and 4, the parking slot position calibration method according to an embodiment of the present disclosure may include determining whether a difference between a center point 314 of the first entrance line 311 and the longitudinal position of a side camera 301 of the vehicle is smaller than a first threshold in an operation S231. Here, the longitudinal direction may be the traveling direction of the vehicle 300. For example, in FIG. 3, the longitudinal direction may be the x-axis direction.

The parking slot position calibration method may include determining whether a difference between the first entrance line measurement length and an entrance line reference length is smaller than a second threshold in an operation S232. The entrance line reference length may refer to the standard value of the entrance line for each type of predetermined parking slot (for example, a rectangular parking slot, a parallelogram parking slot, etc.). The operations S231 and S232 may be performed in any order.

The parking slot position calibration method may include updating a second entrance line tracking length generated in a previous frame if i) the difference between the center point 314 of the first entrance line 311 and the longitudinal position of the side camera 301 of the vehicle is less than the first threshold and ii) the difference between the first entrance line measurement length and an entrance line reference length is smaller than the second threshold (an operation S233). Specifically, if a difference between the center point 314 of the first entrance line 311 and the longitudinal position of the vehicle side camera 301 is less than the first threshold, it may mean that the distance between the side camera 301 and the first parking slot 310 is closer by a certain distance in the longitudinal direction. In other words, the parking slot position calibration method may include updating the second entrance line tracking length if the vehicle 300 is adjacent to the first parking slot 310 by less than a predetermined distance.

Additionally, if the difference between the first entrance line measurement length and the entrance line reference length is smaller than the second threshold, it may mean that the first parking slot 310 is not an irregular parking slot. In other words, if the difference between the entrance line reference length, which is a predetermined standardized value, and the first entrance line measurement length is less than the second threshold, the first parking slot 310 may be one of regular parking slots. The parking slot position calibration method may include updating the second entrance line tracking length if the first parking slot 310 is not an irregular parking slot.

The parking slot position calibration method may include generating a first entrance line tracking length by updating the second entrance line tracking length based on the second entrance line tracking length generated in the previous frame and the first entrance line measurement length generated in the current frame. Specifically, the parking slot position calibration method may include generating the first entrance line tracking length based on the second entrance line tracking length and the first entrance line measurement length using an arbitrary filter. For example, the parking slot position calibration method may include, but the present disclosure is not limited to, generating the first entrance line tracking length by inputting the second entrance line tracking length and the first entrance line measurement length into a Kalman filter to predict the first entrance line tracking length.

The initial value of the entrance line tracking length may be the entrance line reference length described above. In other words, if tracking of the length of the first entrance line 311 is performed for the first time in the previous frame, the second entrance line tracking length may be the entrance line reference length.

Figure 5:
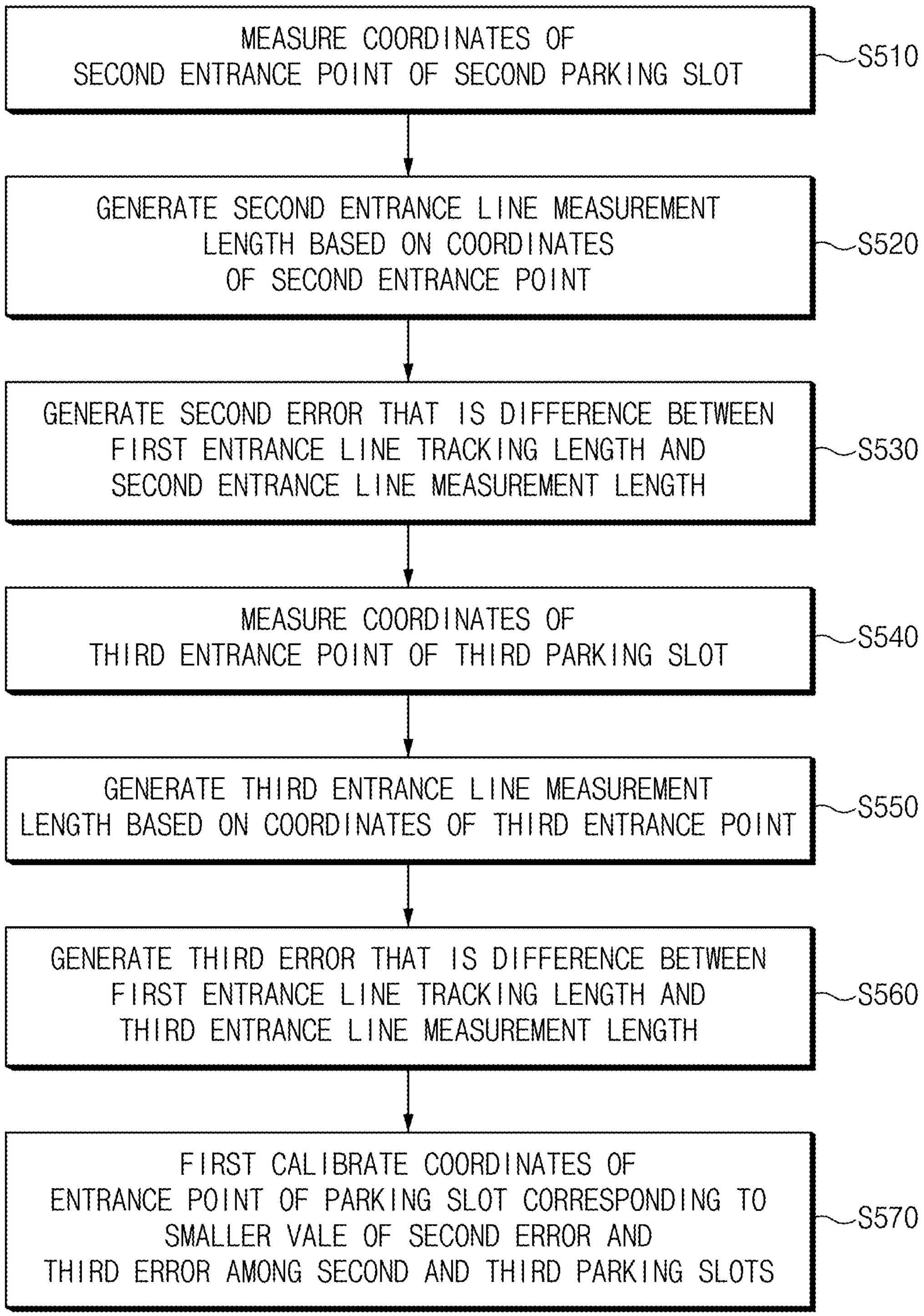
FIG. 5 is a flowchart illustrating a parking slot position calibration method according to an embodiment of the present disclosure.

FIG. 5 is a flowchart showing a parking slot position calibration method according to an embodiment of the present disclosure.

The parking slot position calibration method according to an embodiment of the present disclosure may include calibrating a parking slot position in the order in which the longitudinal position error of the entrance points is smaller among a plurality of parking slots.

Specifically, referring to FIG. 5, the parking slot position calibration method according to an embodiment of the present disclosure may include measuring coordinates of a second entrance point of a second parking slot in an operation S510.

The parking slot position calibration method may include generating a second entrance line measurement length based on the coordinates of the second entrance point in an operation S520. For example, the parking slot position calibration method may include generating the second entrance line measurement length by calculating the Euclidean distance for the coordinates of the second entrance point.

The parking slot position calibration method may include generating a second error, which is a difference between a first entrance line tracking length and the second entrance line measurement length, in an operation S530.

The parking slot position calibration method may include measuring coordinates of a third entrance point of a third parking slot in an operation S540.

The parking slot position calibration method may include generating a third entrance line measurement length based on the coordinates of the third entrance point in an operation S550. For example, the parking slot position calibration method may include generating the third entrance line measurement length by calculating the Euclidean distance for the coordinates of the third entrance point.

The parking slot position calibration method may include generating a third error, which is a difference between the first entrance line tracking length and the third entrance line measurement length, in an operation S560.

The parking slot position calibration method may include, first calibrating the coordinates of the entrance point of the parking slot corresponding to the smaller value of the second error and the third error among the second and third parking slots in an operation S570. For example, if the second error is smaller than the third error, the coordinates of the entrance point of the second parking slot may be calibrated before the coordinates of the entrance point of the third parking slot.

FIGS. 6A to 6F are diagrams for describing a parking slot position calibration method according to an embodiment of the present disclosure.

Figure 6A:
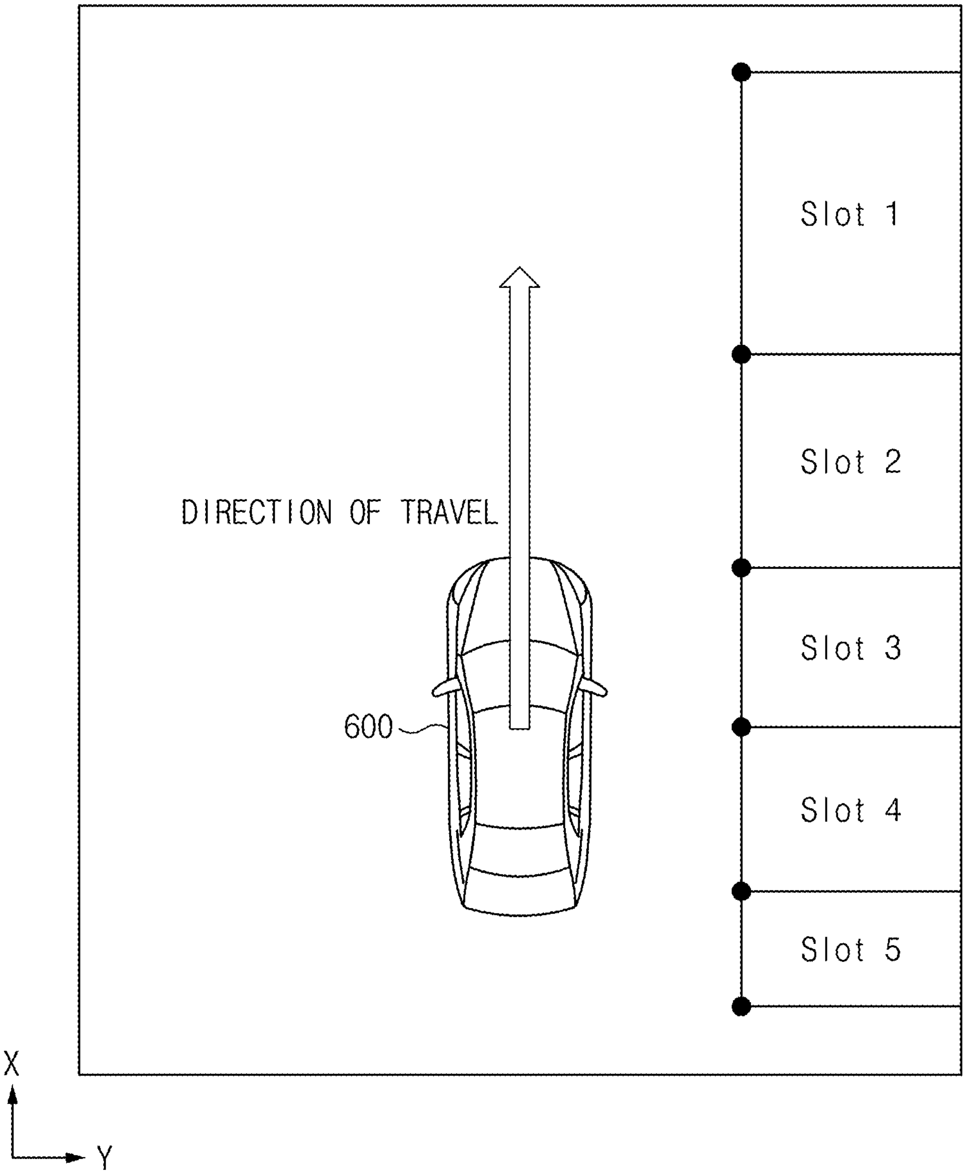
FIG. 6A is a diagram for describing a parking slot position calibration method according to an embodiment of the present disclosure.

Referring to FIG. 6A, a parking slot position calibration method may include recognizing parking slots (Slot 1 to Slot 5). Specifically, the parking slot position calibration method may include measuring entrance points, entrance lines, midpoints of the entrance lines, and angles of the entrance lines of the parking slots. For example, the parking slot position calibration method may include measuring the entrance points, entrance lines, center points of the entrance lines, and angles of the entrance lines in the parking slots using a neural network.

Figure 6B:
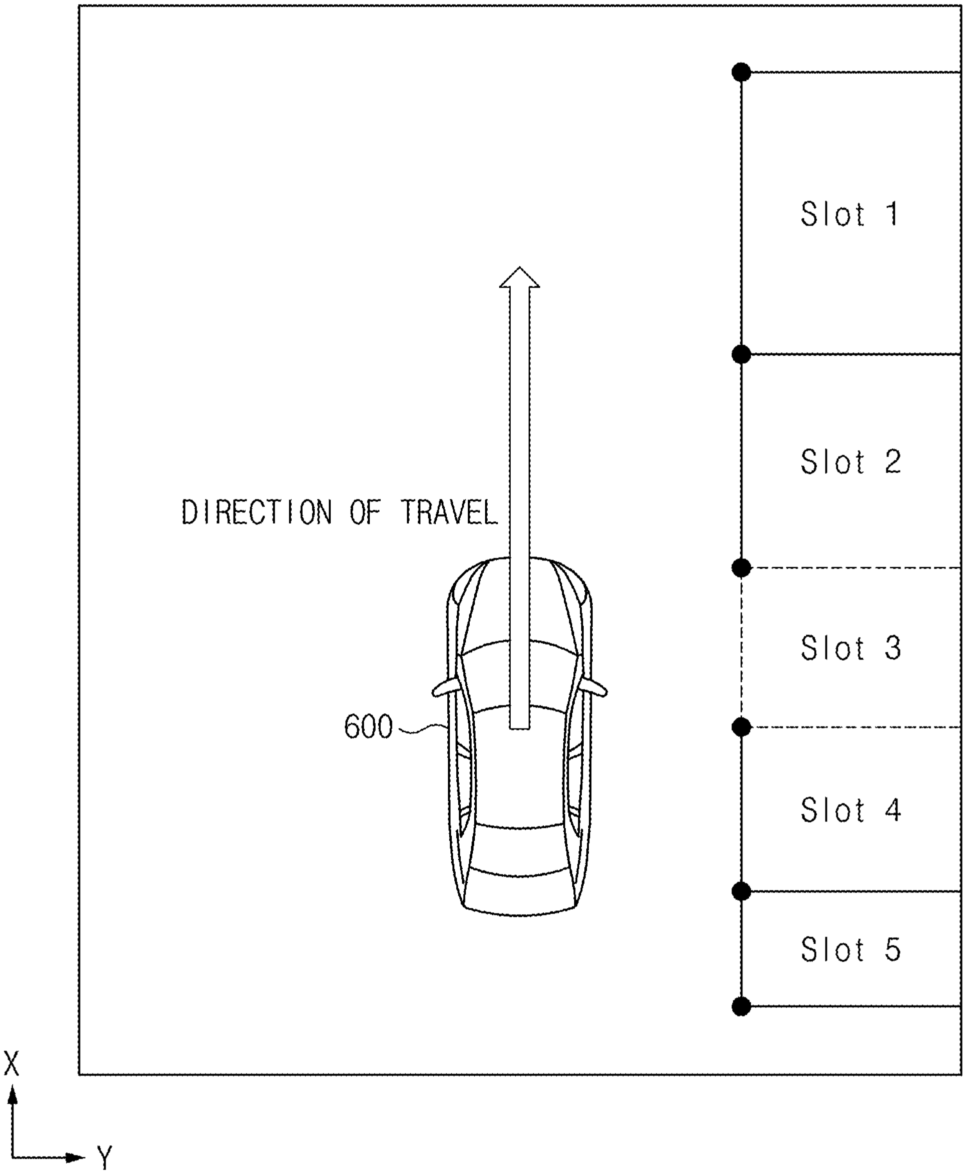
FIG. 6B is a diagram for describing a parking slot position calibration method according to an embodiment of the present disclosure.

Referring to FIG. 6B, the parking slot position calibration method may include setting a reference parking slot. Specifically, the parking slot position calibration method may include selecting a parking slot with the smallest longitudinal distance from a side camera included in a vehicle 600 as the reference parking slot. For example, in FIG. 6B, the parking slot 3 (Slot 3) may be selected as the reference parking slot.

Figure 6C:
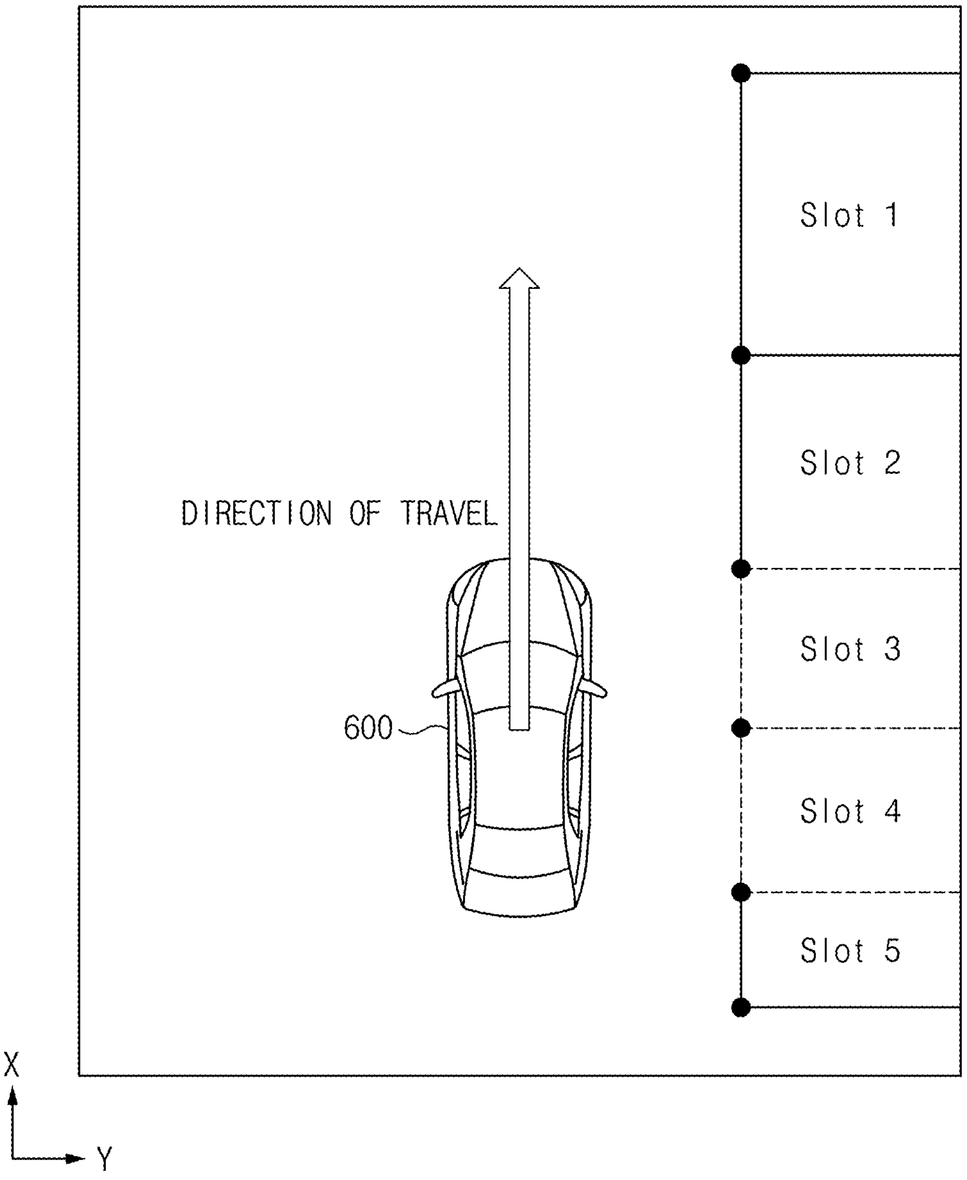
FIG. 6C is a diagram for describing a parking slot position calibration method according to an embodiment of the present disclosure.

Referring to FIG. 6C, the parking slot position calibration method may include performing calibration for the longitudinal position of the entrance point of the parking slot 4 (Slot 4). For example, the parking slot position calibration method may include calibrating the longitudinal position of the coordinates of an entrance point in the order in which the longitudinal position error of the coordinates of entrance point is smaller among the parking slots (Slot 2, Slot 4) adjacent to the parking slot 3 (Slot 3), which is the reference parking slot. The longitudinal position error of the entrance point may be a difference between an entrance line measurement length and an entrance line tracking length. Additionally, the parking slot position calibration method may include calibrating the longitudinal position of the coordinates of the entrance point if the longitudinal position error of the coordinates of the entrance point is greater than the third threshold. Assuming that among the parking slots (Slot 2, Slot 4), the parking slot with the small longitudinal position error of the coordinates of the entrance point is parking slot 4 (Slot 4), the longitudinal position of the coordinates of the entrance point of the parking slot 4 (Slot 4) may be calibrated. Specifically, the coordinate located below among the x-axis (longitudinal axis) coordinates of the entrance point of the parking slot 4, which is located longitudinally below the parking slot 3, which is the reference parking slot, may be calculated as follows:

$$x\text{-axis coordinate of calibrated entrance point below} = (x\text{-axis coordinate of entrance point below before calibration}) - (\text{error}) * \cos(\theta'')$$

Here, the error may be the difference between the entrance line tracking length and the entrance line measurement length. θ" may be [entrance line angle (θ)+90°] if the entrance line angle (θ) is greater than 0, and [entrance line angle (θ)−90°] if the entrance line angle is less than 0.

Figure 6D:
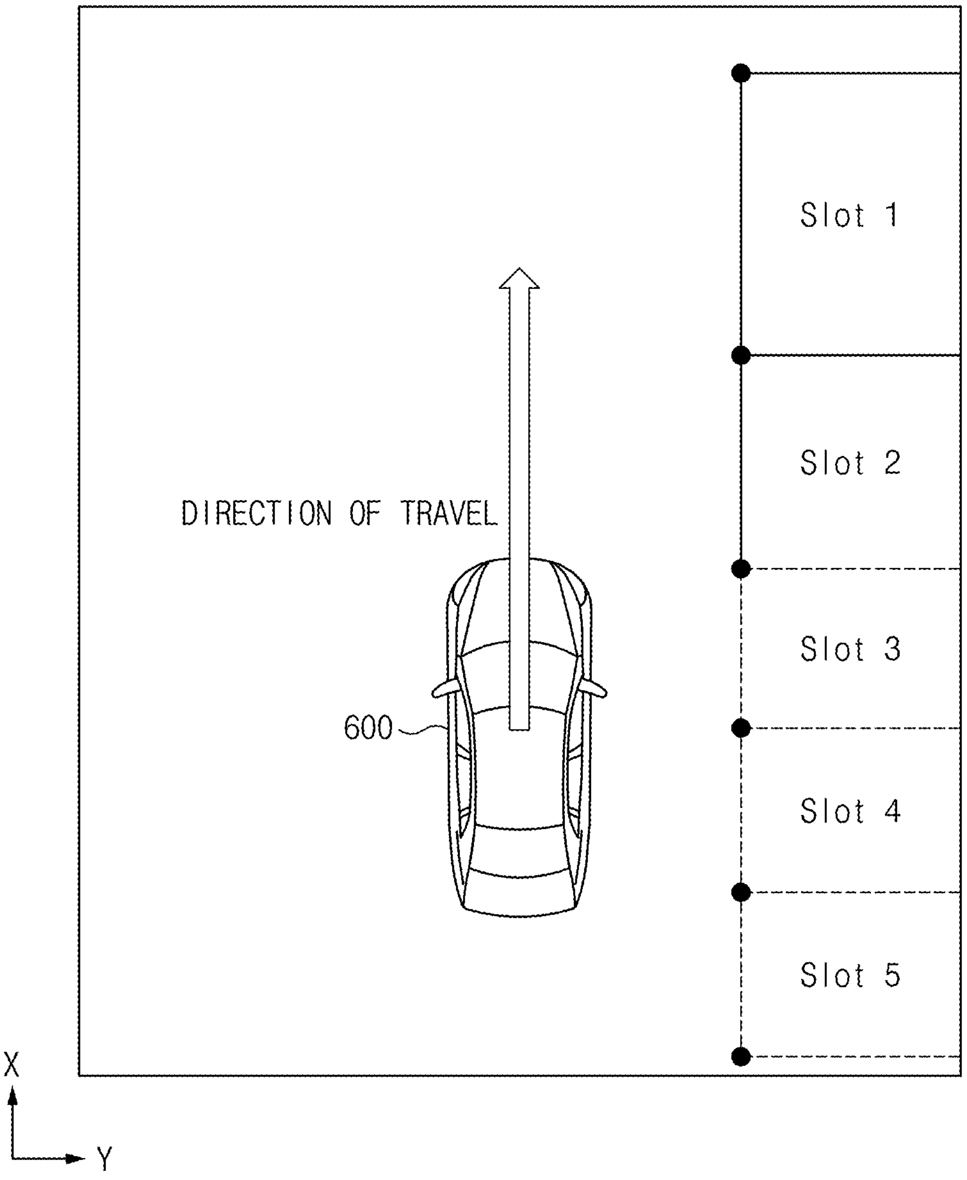
FIG. 6D is a diagram for describing a parking slot position calibration method according to an embodiment of the present disclosure.

Referring to FIG. 6D, the parking slot position calibration method may include performing calibration on the longitudinal position of the entrance point of the parking slot (Slot 5). For example, the parking slot position calibration method may include calibrating the longitudinal position of the coordinates of entrance point in the order in which the longitudinal position error of the coordinates of the entrance point is smaller among the parking slots. Additionally, the parking slot position calibration method may include calibrating the longitudinal position of the coordinates of the entrance point if the longitudinal position error of the coordinates of the entrance point is greater than the third threshold. Assuming that among the parking slots, the parking slot with the small longitudinal position error of the coordinates of the entrance point is the parking slot 5 (Slot 5), the longitudinal position of the coordinates of the entrance point of the parking slot 5 (Slot 5) may be calibrated. Specifically, the coordinate located below among the x-axis coordinates of the entrance point of the parking slot 5, which is located longitudinally below the parking slot 3, which is the reference parking slot, may be calculated as follows:

$$x\text{-axis coordinate of calibrated entrance point below} = (x\text{-axis coordinate of entrance point below before calibration}) - (\text{error}) * \cos(\theta'')$$

Here, the error may be the difference between the entrance line tracking length and the entrance line measurement length. Additionally, θ" may be [entrance line angle (θ)+90°] if the entrance line angle (θ) is greater than 0, and [entrance line angle (θ)−90°] if the entrance line angle is less than 0.

Figure 6E:
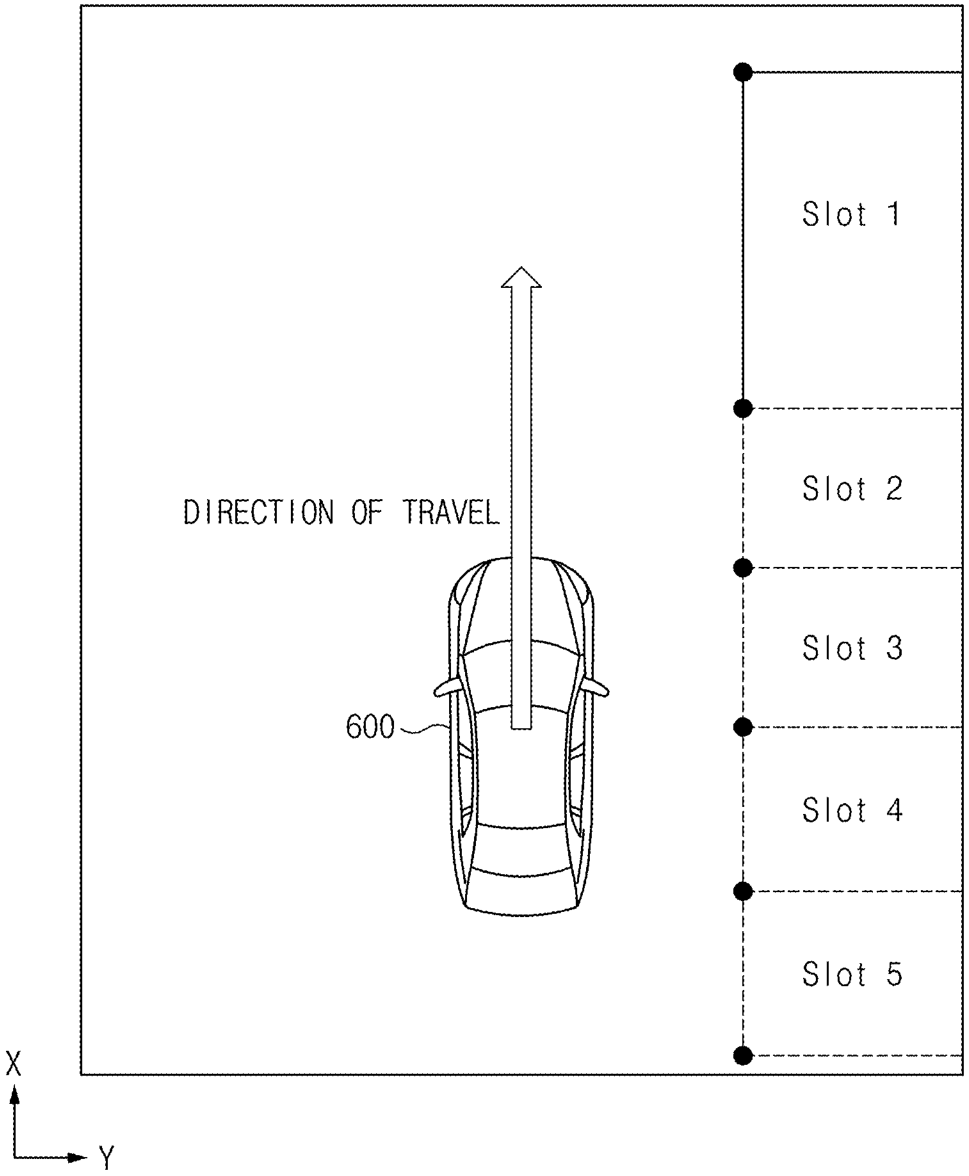
FIG. 6E is a diagram for describing a parking slot position calibration method according to an embodiment of the present disclosure.

Referring to FIG. 6E, the parking slot position calibration method may include performing calibration on the longitudinal position of the entrance point of the parking slot 2 (Slot 2). For example, the parking slot position calibration method may include calibrating the longitudinal position of the coordinates of entrance point in the order in which the longitudinal position error of the coordinates of the entrance point is smaller among the parking slots. Additionally, the parking slot position calibration method may include calibrating the longitudinal position of the coordinates of the entrance point if the longitudinal position error of the coordinates of the entrance point is greater than the third threshold. Assuming that among the parking slots, the parking slot with the small longitudinal position error of the coordinates of the entrance point is the parking slot 2 (Slot 2), the longitudinal position of the coordinates of the entrance point of the parking slot 2 (Slot 2) may be calibrated. Specifically, the coordinate located above among the x-axis coordinates of the entrance point of the parking slot 2, which is located longitudinally above the parking slot 3, which is the reference parking slot, may be calculated as follows:

$$x\text{-axis coordinate of calibrated entrance point above} = (x\text{-axis coordinate of entrance point above before calibration}) - (\text{error})*\cos(\theta'')$$

Here, the error may be the difference between the entrance line tracking length and the entrance line measurement length. Additionally, O" may be [entrance line angle (θ)+90°] if the entrance line angle (θ) is greater than 0, and [entrance line angle (θ)−90°] if the entrance line angle is less than 0.

Figure 6F:
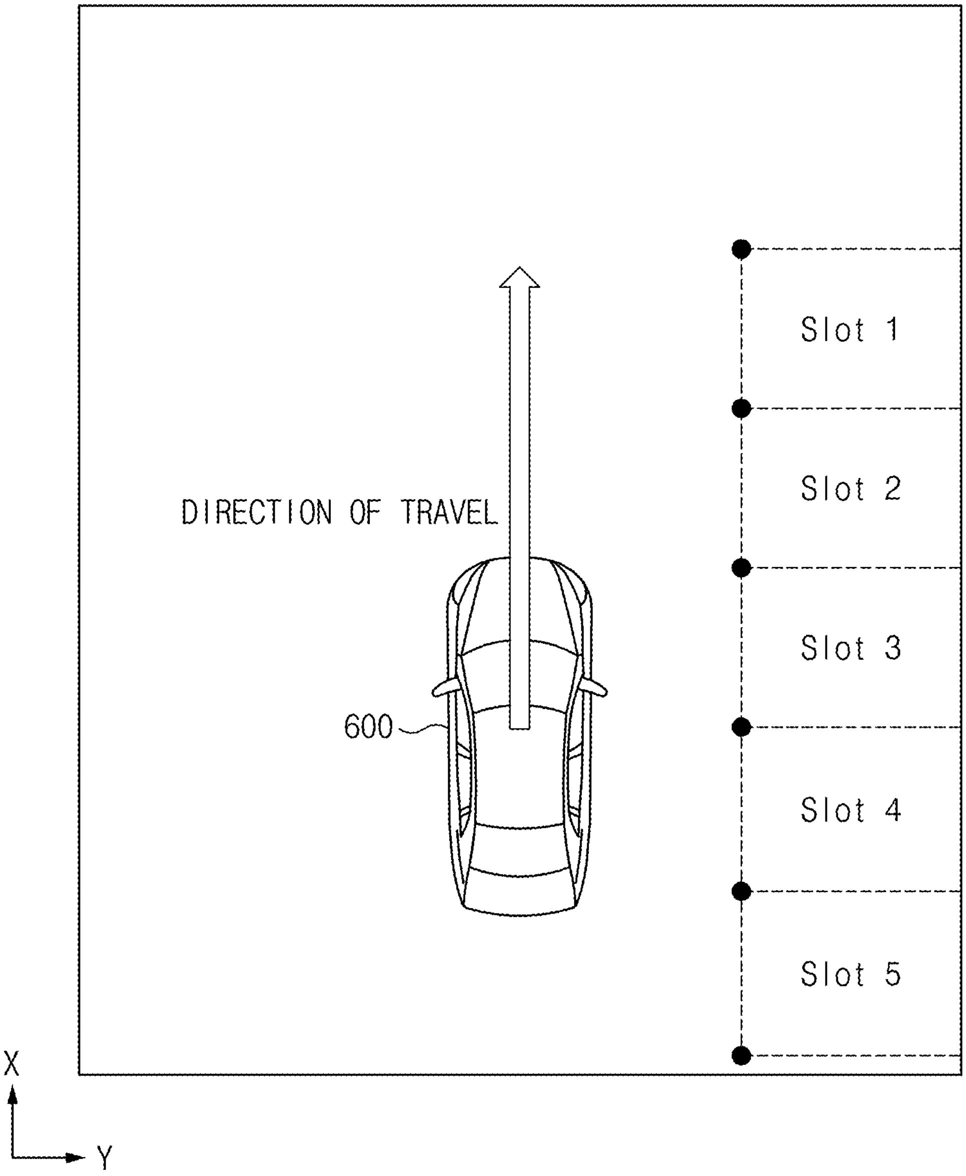
FIG. 6F is a diagram for describing a parking slot position calibration method according to an embodiment of the present disclosure.

Referring to FIG. 6F, the parking slot position calibration method may include performing calibration on the longitudinal position of the entrance point of the parking slot 1 (Slot 1), which is the remaining parking slot. The parking slot position calibration method may include calibrating the longitudinal position of the coordinates of the entrance point if the longitudinal position error of the coordinates of the entrance point is greater than the third threshold. Specifically, the coordinate located above among the x-axis coordinates of the entrance point of the parking slot 1, which is located longitudinally above the parking slot 3, which is the reference parking slot, may be calculated as follows;

$$x\text{-axis coordinate of calibrated entrance point above} = (x\text{-axis coordinate of entrance point above before calibration}) + (\text{error})*\cos(\theta'')$$

Here, the error may be the difference between the entrance line tracking length and the entrance line measurement length. Additionally, θ" may be [entrance line angle (θ)+90°] if the entrance line angle (θ) is greater than 0, and [entrance line angle (θ)−90°] if the entrance line angle is less than 0.

Figure 7:
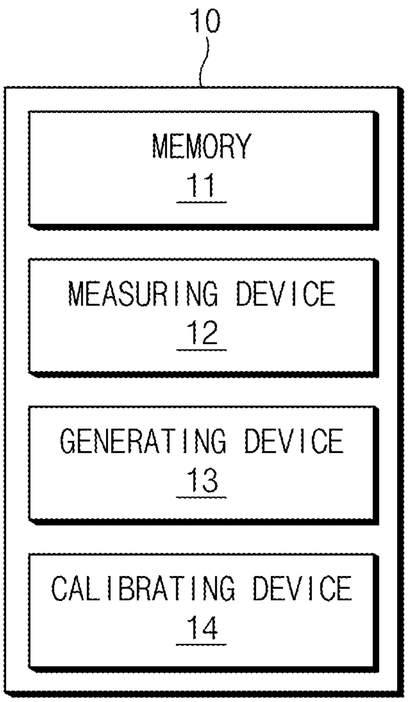
FIG. 7 is a block diagram illustrating a parking slot position calibration device according to an embodiment of the present disclosure.

FIG. 7 is a block diagram showing a parking slot position calibration device according to an embodiment of the present disclosure.

Referring to FIG. 7, a parking slot position calibration device 10 according to an embodiment of the present disclosure may include a memory 11, a measuring device 12, a generating device 13, and a calibrating device 14. The measuring device 12, the generating device 13, and the calibrating device 14 may correspond to a processor. Additionally, the parking slot position calibration device 10 may correspond to a vehicle control device.

The memory 11 may be configured to store computer-executable instructions.

Additionally, the parking slot position calibration device 10 may include at least one processor configured to access the memory 11 and execute the instructions.

The parking slot position calibration device 10 may measure the coordinates of the first entrance point of a first parking slot through the measuring device 12. For example, the parking slot position calibration device 10 may measure the coordinates of the first entrance point of the first parking slot based on a bird's-eye-view (BEV) image by using a neural network through the measuring device 12. In addition, the parking slot position calibration device 10 may generate a first entrance line measurement length based on the coordinates of the measured first entrance point through the generating device 13, and generate a first entrance line tracking length by tracking the length of the first entrance line based on the first entrance line measurement length.

The parking slot position calibration device 10 may calibrate the coordinates of the first entrance point based on a first error, which is the difference between the first entrance line tracking length and the first entrance line measurement length, through the calibrating device 14.

In addition, the parking slot position calibration device 10 may generate the first entrance line tracking length by updating a second entrance line tracking length generated in the previous frame, through the generating device 13 if i) a difference between the center point of the first entrance line and the longitudinal position of the side camera of a vehicle is less than the first threshold, and ii) the difference between the first entrance line measurement length and the entrance line reference length is less than the second threshold. Specifically, the parking slot position calibration device 10 may generate a first entrance line tracking length by updating the second entrance line tracking length based on the second entrance line tracking length generated in the previous frame and the first entrance line measurement length generated in the current frame, through the generating device 13. In addition, the parking slot position calibration device 10 may generate the first entrance line tracking length by predicting the first entrance line tracking length based on the second entrance line tracking length and the first entrance line measurement length using a certain filter, through the generating device 13. For example, the parking slot position calibration device 10 may predict the first entrance line tracking length using a Kalman filter. In addition, if tracking of the length of the first entrance line is performed for the first time in the previous frame, the second entrance line tracking length may be the entrance line reference length.

The parking slot position calibration device 10 may calibrate the coordinates of the first entrance point based on the first error, and an angle between the vehicle and a parking line adjacent to the first entrance line in the first parking slot, through the calibrating device 14.

The parking slot position calibration device 10 may measure the coordinates of the second entrance point of a second parking slot and the coordinates of the third entrance point of a third parking slot, through the measuring device 12. In addition, the parking slot position calibration device 10 may generate, through the generating device 13, a second entrance line measurement length based on the coordinates of the second entrance point, generate a second error that is the difference between the first entrance line tracking length and the second entrance line measurement length, generate a third entrance line measurement length based on the coordinates of the third entrance point, and generate a third error that is the difference between the first entrance line tracking length and the third entrance line measurement length.

The parking slot position calibration device 10 may first calibrate the coordinates of the entrance point of the parking slot corresponding to the smaller value between the second error and the third error among the second and third parking slots, through the calibrating device 14.

Figure 8:
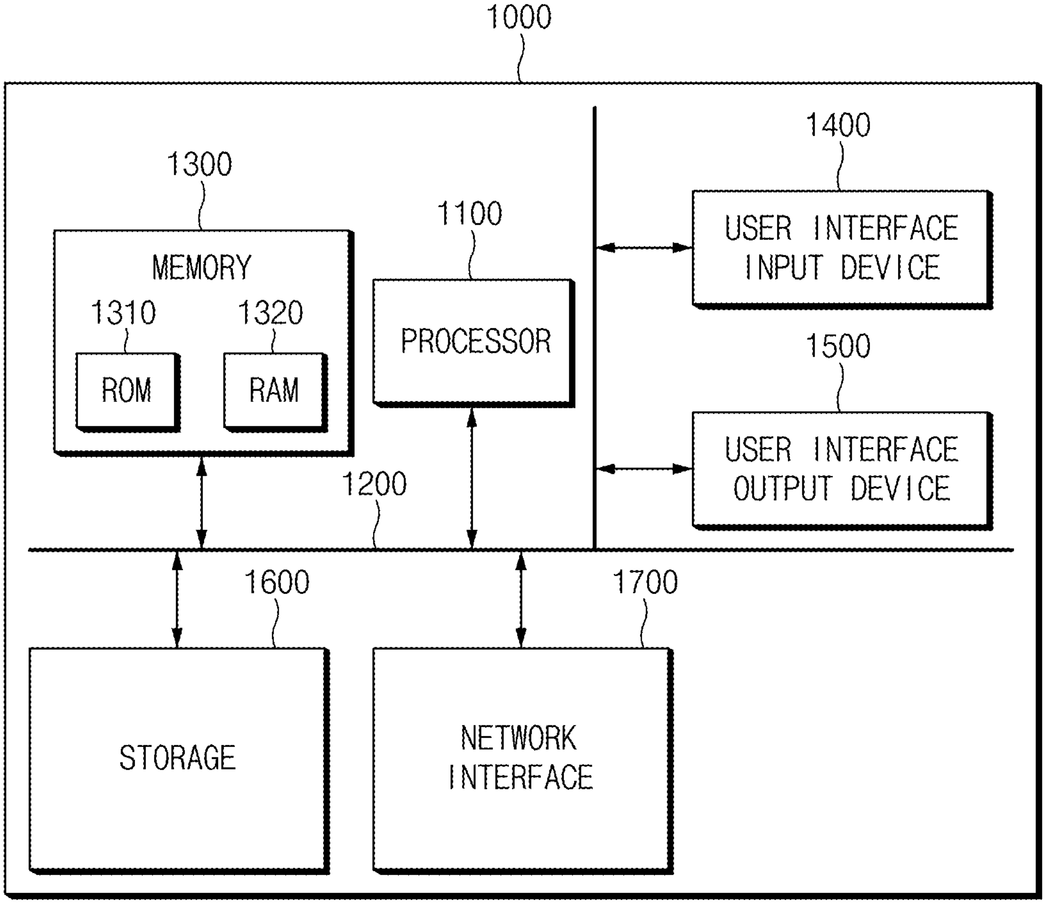
FIG. 8 is a block diagram of a computing system for performing a parking slot position calibration method according to an embodiment of the present disclosure.

FIG. 8 is a block diagram of a computing system for performing a parking slot position calibration method according to an embodiment of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those having ordinary skill in the art to which the present disclosure pertains. Therefore, the embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims, and all technical ideas within the scope equivalent thereto should be construed as being included in the scope of the present disclosure.

According to the vehicle control method according to the embodiments of the present disclosure, it is possible to obtain the exact coordinates of the entrance point of a parking slot.

According to the vehicle control method according to the embodiments of the present disclosure, it is possible to calibrate the coordinates of the entrance point of a parking slot if there is a slope on the road surface on which a vehicle is located.

According to the vehicle control method according to the embodiments of the present disclosure, it is possible to reduce errors in a route for autonomous parking control.

According to the vehicle control method according to the embodiments of the present disclosure, it is possible to shorten time required to determine a route for autonomous parking control.

According to the vehicle control method according to the embodiments of the present disclosure, it is possible to improve the performance of autonomous parking.

The effects obtainable in the present disclosure are not limited to the aforementioned effects, and any other effects not mentioned herein should be clearly understood from the following description by those having ordinary skill in the art to which the present disclosure pertains.

Hereinabove, although the present disclosure has been described with reference to embodiments and the accompanying drawings, the present disclosure is not limited thereto, but may be variously modified and altered by those having ordinary skill in the art to which the present disclosure pertains without departing from the spirit and scope of the present disclosure claimed in the following claims.

What is claimed is:

1. A vehicle control method comprising:

measuring, by a measuring device, coordinates of a first entrance point that is an end point of a first entrance line in a first parking slot;

generating, by a generating device, a first entrance line measurement length based on the measured coordinates of the first entrance point;

generating, by the generating device, a first entrance line tracking length by tracking a length of the first entrance line based on the first entrance line measurement length while a vehicle is moving;

calibrating, by a calibrating device, the coordinates of the first entrance point based on a first error that is a difference between the first entrance line tracking length and the first entrance line measurement length; and controlling the vehicle during autonomous parking based on the calibrated coordinates of the first entrance point.

2. The vehicle control method of claim 1, wherein generating the first entrance line tracking length includes:

generating, by the generating device, the first entrance line tracking length by updating a second entrance line tracking length generated in a previous frame when a difference between a center point of the first entrance line and a longitudinal position of a side camera of a vehicle is less than a first threshold, and when a difference between the first entrance line measurement length and an entrance line reference length is less than a second threshold.

3. The vehicle control method of claim 2, wherein generating the first entrance line tracking length includes:

generating, by the generating device, the first entrance line tracking length by updating the second entrance line tracking length based on the second entrance line tracking length generated in the previous frame and the first entrance line measurement length generated in a current frame.

4. The vehicle control method of claim 3, wherein generating the first entrance line tracking length includes:

generating, by the generating device, the first entrance line tracking length by predicting the first entrance line tracking length based on the second entrance line tracking length and the first entrance line measurement length using an arbitrary filter.

5. The vehicle control method of claim 2, wherein the second entrance line tracking length is the entrance line reference length when tracking for the length of the first entrance line is first performed in the previous frame.

6. The vehicle control method of claim 1, wherein calibrating the coordinates of the first entrance point includes:

calibrating, by the calibrating device, the coordinates of the first entrance point based on the first error and an angle between a vehicle and a parking line adjacent to the first entrance line in the first parking slot when the first error is greater than a third threshold.

7. The vehicle control method of claim 1, further comprising:

measuring, by the measuring device, coordinates of a second entrance point of a second parking slot;

generating, by the generating device, a second entrance line measurement length based on the coordinates of the second entrance point;

generating, by the generating device, a second error that is a difference between the first entrance line tracking length and the second entrance line measurement length;

measuring, by the measuring device, coordinates of a third entrance point of a third parking slot;

generating, by the generating device, a third entrance line measurement length based on the coordinates of the third entrance point;

generating, by the generating device, a third error that is a difference between the first entrance line tracking length and the third entrance line measurement length; and first calibrating, by the calibrating device, coordinates of an entrance point of a parking slot corresponding to a smaller value between the second error and the third error among the second parking slot and the third parking slot.

8. The vehicle control method of claim 1, wherein measuring the coordinates of the first entrance point of the first parking slot includes:

measuring, by the measuring device, the coordinates of the first entrance point of the first parking slot based on a Bird's Eye View (BEV) image through a neural network.

9. A vehicle control device comprising:

a memory configured to store computer-executable instructions; and at least one processor configured to access the memory and execute the computer-executable instructions, wherein the at least one processor is configured to:

measure, through a measuring device, coordinates of a first entrance point that is an end point of a first entrance line in a first parking slot;

generate, through a generating device, a first entrance line measurement length based on the measured coordinates of the first entrance point and generate a first entrance line tracking length by tracking a length of the first entrance line based on the first entrance line measurement length while a vehicle is moving;

calibrate, through a calibrating device, the coordinates of the first entrance point based on a first error that is a difference between the first entrance line tracking length and the first entrance line measurement length; and control the vehicle during autonomous parking based on the calibrated coordinates of the first entrance point.

10. The vehicle control device of claim 9, wherein the at least one processor is configured to:

generate, through the generating device, the first entrance line tracking length by updating a second entrance line tracking length generated in a previous frame when a difference between a center point of the first entrance line and a longitudinal position of a side camera of a vehicle is less than a first threshold, and a difference between the first entrance line measurement length and an entrance line reference length is less than a second threshold.

11. The vehicle control device of claim 10, wherein the at least one processor is configured to:

generate, through the generating device, the first entrance line tracking length by updating the second entrance line tracking length based on the second entrance line tracking length generated in the previous frame and the first entrance line measurement length generated in a current frame.

12. The vehicle control device of claim 11, wherein the at least one processor is configured to:

generate, through the generating device, the first entrance line tracking length by predicting the first entrance line tracking length based on the second entrance line tracking length and the first entrance line measurement length using an arbitrary filter.

13. The vehicle control device of claim 10, wherein the second entrance line tracking length is the entrance line reference length when tracking for the length of the first entrance line is first performed in the previous frame.

14. The vehicle control device of claim 9, wherein the at least one processor is configured to:

calibrate, through the calibrating device, the coordinates of the first entrance point based on the first error and an angle between a vehicle and a parking line adjacent to the first entrance line in the first parking slot when the first error is greater than a third threshold.

15. The vehicle control device of claim 9, wherein the at least one processor is configured to:

measure, through the measuring device, coordinates of a second entrance point of a second parking slot and coordinates of a third entrance point of a third parking slot;

generate, through the generating device, a second entrance line measurement length based on the coordinates of the second entrance point, generate a second error that is a difference between the first entrance line tracking length and the second entrance line measurement length, generate a third entrance line measurement length based on the coordinates of the third entrance point, and generate a third error that is a difference between the first entrance line tracking length and the third entrance line measurement length; and first calibrate, through the calibrating device, coordinates of an entrance point of a parking slot corresponding to a smaller value between the second error and the third error among the second parking slot and the third parking slot.

16. The vehicle control device of claim 9, wherein the at least one processor is configured to:

measure, through the measuring device, the coordinates of the first entrance point of the first parking slot based on a Bird's Eye View (BEV) image by using a neural network.

* * * * *